(12) United States Patent
Foster et al.

(10) Patent No.: US 9,564,034 B2
(45) Date of Patent: *Feb. 7, 2017

(54) REAL TIME THREAT DETECTION SYSTEM USING INTEGRATED PASSIVE SENSORS

(71) Applicant: THERMAL MATRIX USA, INC., Tampa, FL (US)

(72) Inventors: John William Foster, Tampa, FL (US); Michael A. Reinpoldt, Windermere, FL (US); Willem H. Reinpoldt, III, Tarpon Springs, FL (US)

(73) Assignee: THERMAL MATRIX USA, INC., Tampa, FL (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/707,448

(22) Filed: May 8, 2015

(65) Prior Publication Data
US 2016/0086466 A1 Mar. 24, 2016

Related U.S. Application Data

(63) Continuation of application No. 13/478,151, filed on May 23, 2012, now Pat. No. 9,030,320, which is a continuation-in-part of application No. 11/870,862, filed on Oct. 11, 2007, now abandoned.

(60) Provisional application No. 60/829,041, filed on Oct. 11, 2006.

(51) Int. Cl.
| | | |
|---|---|---|
| *G08B 21/00* | (2006.01) | |
| *G08B 13/24* | (2006.01) | |
| *G06K 9/00* | (2006.01) | |

(52) U.S. Cl.
CPC ....... *G08B 13/2494* (2013.01); *G06K 9/00771* (2013.01); *G06K 2009/00644* (2013.01); *G06K 2209/09* (2013.01)

(58) Field of Classification Search
CPC ........ G01S 13/887; G01S 13/89; G01S 13/04; G06K 9/00771; G06K 2209/09
USPC ......................... 340/517, 521, 522, 541, 552
See application file for complete search history.

(56) References Cited

U.S. PATENT DOCUMENTS

| | | |
|---|---|---|
| 5,355,447 A | 10/1994 | Knowlton |
| 6,417,797 B1 | 7/2002 | Cousins et al. |
| 7,238,940 B1 | 7/2007 | Davidson et al. |
| 7,253,766 B2 | 8/2007 | Foote et al. |
| 7,889,113 B2 | 2/2011 | Cardiasmenos et al. |
| 2004/0174289 A1 | 9/2004 | Singh et al. |

(Continued)

OTHER PUBLICATIONS

ThruVision TS4, 10 pp. 2015, http://www.digitalbarriers.com/thruvision-ts4.

(Continued)

*Primary Examiner* — Mark Rushing
(74) *Attorney, Agent, or Firm* — Matthew G. McKinney, Esq.; Allen, Dyer, Doppelt, Milbrath & Gilchrist, P.A.

(57) ABSTRACT

A real-time threat detection system incorporating a plurality of sensors adapted to detect radiation across the majority of the electromagnetic spectrum. The system also includes an aided or automatic target recognition module which compares the data from the sensors against known radiation signatures and issues an alert when an anomalous signature is detected. The system further includes an operator station which displays sensor information allowing the operator to intervene. The sensors detect radiation which is normally emitted by persons or other bodies and display areas to the operator where normal emissions are blocked.

21 Claims, 10 Drawing Sheets

(56) References Cited

U.S. PATENT DOCUMENTS

| | | |
|---|---|---|
| 2004/0183712 A1 | 9/2004 | Levitan et al. |
| 2005/0110672 A1 | 5/2005 | Cardiasmenos et al. |
| 2005/0232459 A1 | 10/2005 | Rowe et al. |
| 2006/0012510 A1 | 1/2006 | Rowe |
| 2006/0022140 A1 | 2/2006 | Connelly et al. |
| 2006/0056586 A1 | 3/2006 | Uetake et al. |
| 2006/0104480 A1 | 5/2006 | Fleisher |
| 2006/0233045 A1 | 10/2006 | Fluhler et al. |
| 2007/0114418 A1 | 5/2007 | Mueller et al. |
| 2007/0122003 A1 | 5/2007 | Dobkin et al. |
| 2007/0139248 A1 | 6/2007 | Baharav et al. |
| 2008/0043101 A1 | 2/2008 | Sharma |
| 2008/0100504 A1 | 5/2008 | Martin et al. |
| 2008/0129581 A1 | 6/2008 | Douglass et al. |
| 2009/0283830 A1 | 11/2009 | Pergande et al. |
| 2009/0322873 A1 | 12/2009 | Reilly et al. |

OTHER PUBLICATIONS

Defender Turk International Security Solutions, Product Brief T40000 Passive Stand-Off Screen Systems, 2012, ThruVision, pp. 1-2.

Dickenson et al.—Terahertz Imaging of Subjects with Concealed Weapons, 2004, Submillimeter-Wave Technology Laboratory, University of Massachusetts Lowell, U.S. Army National Ground Intelligence Center, pp. 13.

Ghosh et al.—A Real-Time Intrusion Detection System Based on Learning Program Behavior, 2000, Lecture Notes in Science, pp. 17.

```
// concealed object detection: method 1
// sum pixels outlying an acceptable range of gray scale pixel
// values exceeds a threshold
bool objectDetected = false;
int outlierCount = 0;
for (int y = 0; y < imageHeight; y++)
    for (int x = 0; x < imageHeight; x++)
    {
        int pixelValue = buffer[y, x];
        if ((pixelValue < minGray) || (pixelValue > maxGray))
            outlierCount++;
    }
if (outlierCount > alarmThreshold)
    objectDetected = true;
```
910

```
// concealed object detection: method 2
// sum gray values outlying an acceptable range of gray scale pixel
// values exceeds a threshold
bool objectDetected = false;
int outlierSum = 0;
for (int y = 0; y < imageHeight; y++)
    for (int x = 0; x < imageHeight; x++)
    {
        int pixelValue = buffer[y, x];
        if (pixelValue < minGray)
            outlierSum += minGray - pixelValue;
        else if (pixelValue > maxGray)
            outlierSum += pixelValue - maxGray;
    }
if (outlierSum > alarmThreshold)
    objectDetected = true;
```
920

```
// concealed object detection: method 3
// sum pixels outlying an acceptable range of gradient values
// exceeds a threshold
bool objectDetected = false;
int gradientCount = 0;
for (int y = 0; y < imageHeight - 1; y++)
    for (int x = 0; x < imageHeight - 1; x++)
    {
        if (Math.Abs(buffer[y, x] - buffer[y, x + 1]) > maxGradient)
            gradientCount++;
        else if (Math.Abs(buffer[y, x] - buffer[y + 1, x]) > maxGradient)
            gradientCount++;
    }
if (gradientCount > alarmThreshold)
    objectDetected = true;
```
930

FIG. 8

```
// ATP voting mechanism
// determine threat status based on individual detection results
public int vote(bool detectTHZ, bool detectMMW, bool detectIR)
{
        int alarmLevel = 0;          // 0 = none, 1 = nuisance, 2 = alarm, 3 = high alarm if (detectTHZ == true)
            alarmLevel++;
        if (detectMMW == true)
            alarmLevel++;
        if (detectIR == true)
            alarmLevel++;

return (alarmLevel);
}
```

1010

```
// alpha blend THZ, MMW, IR, CCTV images
// assumes percentTHZ + percentMMW + percentIR <= 100
// assumes bufferTHZ, bufferMMW, bufferIR are scaled to same size
public bool alphaBlend(int percentTHZ, int percentMMW, int percentIR)
{
        bool errorFlag = false;
        int percentCCTV = 100 - percentTHZ - percentMMW - percentIR;

if ((percentCCTV < 0) || (percentCCTV > 100))
            return (errorFlag = true);

for (int y = 0; y < imageHeight; y++)
            for (int x = 0; x < imageWidth; x++)
                bufferDisplay[y, x] =
                    (bufferTHZ[y, x] * percentTHZ
                    + bufferMMW[y, x] * percentMMW
                    + bufferIR[y, x] * percentIR
                    + bufferCCTV[y, x] * percentCCTV) / 100;

return (errorFlag = false);
}
```

REAL TIME THREAT DETECTION SYSTEM USING INTEGRATED PASSIVE SENSORS

CROSS REFERENCE TO RELATED APPLICATIONS

This application is a continuation of Ser. No. 13/478,151 filed May 23, 2012, now U.S. Pat. No. 9,030,320 which is a continuation-in-part of and claims priority to currently pending U.S. patent application Ser. No. 11/870,862, entitled "Real Time Threat Detection System", filed Oct. 11, 2007, which claims priority to U.S. Provisional Patent Application No. 60/829,041, entitled "Real-Time Threat Detection System", filed Oct. 11, 2006, both of which are incorporated by reference into this disclosure.

STATEMENT OF GOVERNMENT INTEREST

This application is a Continuation in Part for a real time threat detection system made with Government support under Grant No. W15P7T-06-L-9613 awarded by The Department of Defense. The Government, therefore, has certain rights in the system.

COPYRIGHT

This application includes material which is subject to copyright protection. The copyright owner has no objection to the facsimile reproduction of the disclosure as it appears in the Patent and Trademark Office, but otherwise reserves all copyright rights.

BACKGROUND

1. Field

This system relates, generally, to surveillance. More particularly, it relates to the detection of concealed person-borne objects including, but not limited to, Improvised Explosive Devices ("IEDs").

2. Description of Related Art

A wide variety of security systems are employed for consumer, commercial, industrial, government and military applications. Security systems can utilize a variety of technologies, including mechanical, electrical, electromechanical, optical, laser and other techniques. Additionally, security systems can generally be separated into two classes: active and passive.

Active security systems detect disturbances in the absorption and/or reflection of a transmitted signal. Thus active security systems require a transmitter and a receiver to function. Some active security systems utilize a transceiver to accomplish both functions, while others use a possibly disparate "illuminator" separate from the receiver. A common example of an active security system is one based on radar, which uses transmitted energy or sound to illuminate an area or subject and then detect disturbances in the reflected energy or sound. In this example, sound has been explicitly mentioned since sound is debatably not a form of radiated energy but is a vibration of molecules in surrounding medium, such as water or atmosphere. Hence, sound does not propagate in a vacuum whereas typical transmitted energy does.

Passive security systems do not emit radiation or signals but simply observe/image the existing energy contained within a scene. Since there is no transmitter involved, passive security systems are particularly adept at long stand-off surveillance where the sensor and operator can be located a safe distance away from danger or at a distance amenable to interdiction. In the presently described invention, the infrared sensor element of the concealed object detection system can detect the presence of a concealed suicide bomb vest at distances exceeding 100 meters.

Typical passive security systems include visual, infrared, millimeter wave and/or terahertz imaging systems. These passive systems image different frequencies of energy in the electromagnetic spectrum.

Infrared, millimeter wave and terahertz based security systems have the benefit of being able to image concealed objects under the clothing of subjects if properly designed. Imaging and detection of concealed objects is essential for detecting terrorist threats as well as enabling less lethal applications such as detecting contraband or stolen objects. These systems image the contrast between the human body and the concealed object that may block or otherwise attenuate the body's natural energy.

While the human body emits, absorbs and reflects infrared, millimeter wave and terahertz energy in a sensor-observable fashion, concealed objects such as explosives, weapons, contraband and the like block, absorb, reflect or otherwise attenuate the body's energy providing the imaging system with a contrasting signal or image. When considering an imaging system, these contrasts may appear as areas either darker or lighter than the body.

Most clothing is transparent to radiation in the millimeter wave and terahertz spectra, and conductive of body heat in the infrared spectrum. Objects (weapons or bomb devices) that are worn beneath one's apparel will block or attenuate the body's natural radiation and results in a signature that can be detected much as a lamp shade blocks the light from a light bulb. Under most circumstances, large objects such as bomb devices or protective vests worn under clothing present a detectable thermal signature which can be additionally detected using infrared, or thermal, sensors.

The aforementioned capability is effective for imaging suicide bombers, smugglers, and persons with concealed objects such as firearms, contraband, currency, hazardous liquids and gels, and the like. This is especially significant since some threats like plastic explosives, powders, liquids and gels cannot be detected using other forms of security devices such as metal detectors.

Contemporary sensor technology provides individual solutions for imaging in the spectra most favorable for concealed object detection. Infrared sensors produced by FLIR Systems, Inc., millimeter wave sensors produced by Brijot Imaging Systems, Inc., and terahertz sensors produced by Thruvision, Ltd. are available for imaging their respective spectra. Occasionally, these classes of sensors offer a degree of concealed object detection capability within their disparate spectra.

One disadvantage of these passive security systems, and security systems in general, is they typically image using a select subset of the electromagnetic Spectrum as defined by their respective sensor/receiver. Many such passive systems employ a single sensor imaging in the infrared, millimeter wave, terahertz or x-ray band, resulting in a reduction the effectiveness of the detection. Detection capability is reduced since a concealed object may be less observable in one spectrum versus another. Passive infrared systems may offer significant standoff distances but image thermal conduction through the clothes instead of penetrating the clothing. Passive millimeter wave systems excel at detecting metal objects but perform worse detecting liquids. Passive terahertz sensors image through clothing more readily than millimeter wave but suffer greater effects of solar loading outdoors. Here the use of a plurality of sensors imaging disparate spectra is desirable.

A second disadvantage of typical passive security systems is the lack of computer-assisted or automated detection capability. Prior art concealed object imaging and detection systems typically lack computer-assisted or automated detection, or confine such computer-assisted or automated detection to a single frequency in the electromagnetic spectrum.

A third disadvantage of typical passive security systems is they are typically engineered for a particular environment, location or use case, making these systems costly in terms of application-specific engineering, training and support. These systems typically require support infrastructure such as inspection areas/lanes, backdrops and the like to improve the "limited visibility" nature of imaging a singular spectrum, thereby limiting or eliminating their "ad hoc" or "on demand" responsiveness and capabilities.

A fourth disadvantage of typical passive concealed object detection security systems is the fixed-range imaging capability of typical infrared, millimeter wave and terahertz sensors deployed in those systems. The infrared imagers typically do not include zoom optics and millimeter wave and terahertz imagers must be custom designed for a particular narrow operating range by virtue of the aperture, feed horn and antenna design selected during their design and construction phases.

Therefore, a need exists in the art for a concealed object detection security system that employs a plurality of disparate sensors imaging a scene using complimentary spectra. Such a system would leverage the spectral resolving power of each sensor cumulatively offering a "best of all worlds" solution to concealed object detection, by reinforcing the benefits and capability of each sensor while minimizing any one sensor's deficiencies. For example, the outdoor deployment deficiencies inherent in terahertz sensors can be offset by the presence of the infrared and millimeter wave sensors.

Another need exists in the art for a concealed object detection security system for concealed object detection that includes computer-assisted or automated detection capability applied in a holistic system-of-systems methodology. While this capability exists within the spectrum of some individual sensors, true multi-spectral computer-assisted or automated detection capability does not currently exist.

Another need exists in the art for automated sensor fusion capability, reducing the level of effort required by the operator in assessing the imagery of a plurality of disparate sensors. As an example, the imagery of an infrared sensor may depict brighter pixels as areas of greater thermal content while the imagery of a millimeter wave sensor may depict brighter pixels as areas of lower millimeter wave content and the imagery of a terahertz sensor may eschew bright or dark pixels in favor of a false color image. Thus requiring an operator to assess these disparate images in real time and continually is disadvantageous versus employment of automated sensor fusion.

Another need exists in the art for a concealed object detection security system that can be deployed ad hoc into multiple situations by virtue of the magnification of capability provided by a plurality of disparate spectrum sensors. This reduces or eliminates the potential incompatibility of a single sensor system operating in an environment where its efficacy is ill suited to that environment (e.g., a terahertz imager operating under a sunny sky).

Another need exists in the art for a concealed object detection security system of maximized Probability of Detection (Pd) and minimized Probability of False Alarm (Pfa) as can be achieved by imaging multiple disparate spectra and then algorithmically and holistically evaluating the results.

Another need exists in the art for a concealed object detection security system utilizing a plurality of disparate spectrum sensors to include a voting or weighting algorithm, maximizing Pd and minimizing Pfa. Such a voting or weighting algorithm would empathize detection presence when a majority of sensors detect a concealed object and de-empathize detection presence when an isolated (or no) sensor detects a concealed object.

Another need exists in the art for a concealed object detection security system that leverages multi-spectral sensor fusion and multi-sensor voting or weighting algorithms where results from one or more sensors can provide negative feedback to the voting or weighting algorithms on detection of an innocuous concealed object, thusly minimizing Pfa.

Another need exists in the art for a concealed object detection security system that leverages multi-spectral sensor fusion and multi-sensor voting or weighting algorithms to simplify operation for the operator, test and support staff, thereby reducing operator fatigue, training and operator sustaining costs.

Another need exists in the art for a concealed object detection security system that has a deep range imaging capability exceeding the imaging ranges of its individual sensors. The combination of short range millimeter wave imaging, medium range terahertz imaging and long range infrared imaging described in the current system, provides maximal coverage of a variety of ranges heretofore not obtainable from a single sensor solution.

Another need exists in the at for a concealed object detection security system that cohesively combines multi-spectral detection in a single system, providing holistic procurement, deployment, operation, training and support of the homogeneous system versus a multitude of separate systems, each with their own requirements for procurement, setup, environment, operation, training and support.

Another need exists in the art for a concealed object detection security system that is flexible enough to be employed in a wide variety of applications, locations and environments without additional engineering, site preparation, operator training or unit modifications. The system would be quickly deployable for indoor or outdoor conditions, daytime or nighttime conditions, humid or arid conditions, and the like, and exhibit a large advantage over systems that are custom tailored for a particular deployment location or use case, and thereby reduce or eliminate the costs involved in engineering and personnel training for each specific deployment.

However, in view of the prior art at the time the present system was made, it was not obvious to those of ordinary skill in the pertinent art how the identified needs could be fulfilled.

While certain aspects of conventional technologies have been discussed to facilitate disclosure of the system, Applicants in no way disclaim these technical aspects, and it is contemplated that the claimed system may encompass one or more of the conventional technical aspects discussed herein.

The present invention may address one or more of the problems and deficiencies of the related art discussed above. However, it is contemplated that the system may prove useful in addressing other problems and deficiencies in a number of technical areas. Therefore, the claimed system should not necessarily be construed as limited to addressing any of the particular problems or deficiencies discussed herein.

In this specification, where a document, act or item of knowledge is referred to or discussed, this reference or discussion is not an admission that the document, act or item of knowledge or any combination thereof was at the priority date, publicly available, known to the public, part of common general knowledge, or otherwise constitutes prior art under the applicable statutory provisions; or is known to be relevant to an attempt to solve any problem with which this specification is concerned.

SUMMARY

The long-standing but heretofore unfulfilled need for an improved, more effective and more accurate system, function, method and/or software for surveillance or detection of concealed person-borne objects is now met by a new, useful and nonobvious real time threat detection system.

The system provides enhanced detection capabilities of concealed objects by incorporating multiple sensors imaging multiple complimentary and disparate spectra, including thermal imaging devices, millimeter wave sensors and terahertz sensors in a comprehensive, holistic architecture capable of detecting a wide array of concealed articles, such as improvised explosive devices. The architecture provides maximized Probability of Detection (Pd), minimized Probability of False Alarm (Pfa), and increased breath of detectable concealed objects due to the disparate spectra and capabilities of the sensors utilized in the system. Computer assisted or automated algorithms holistically evaluate detection results for increased Pd, decreased Pfa, and reduce operator work load through sensor fusion, providing a cohesive, homogeneous interface.

The threat detection system integrates multiple sensors that target different spectral bands in the electromagnetic spectrum. Where previous threat detection systems rely on sensors or approaches focusing on one spectral band, the present system covers a majority of the electromagnetic spectrum. Each sensor detects emissions within a specific spectral band and has its own capabilities based on the characteristics of that portion of the spectrum. By integrating the sensors into a cohesive whole, the system mitigates the limitation of any individual sensor by harnessing the capabilities of other sensors.

The system is designed to provide soldiers, law enforcement and other security personnel and first responders with a rapidly deployable and reconfigurable tool to enhance security.

These and other important objects, advantages, and features of the system will become clear as this disclosure proceeds.

The real time threat detection system accordingly comprises the features of construction, combination of elements, and arrangement of parts that will be exemplified in the disclosure set forth hereinafter and the scope of the system will be indicated in the claims.

BRIEF DESCRIPTION OF THE DRAWINGS

For a fuller understanding of the real time threat detection system, reference should be made to the following detailed description, taken in connection with the accompanying drawings, in which:

FIG. 8 illustrates algorithms for concealed threat detection in one embodiment of the ATR Module software;

FIG. 9 illustrates algorithms for detection voting/weighing mechanisms and image fusion.

DETAILED DESCRIPTION

Figure 1:
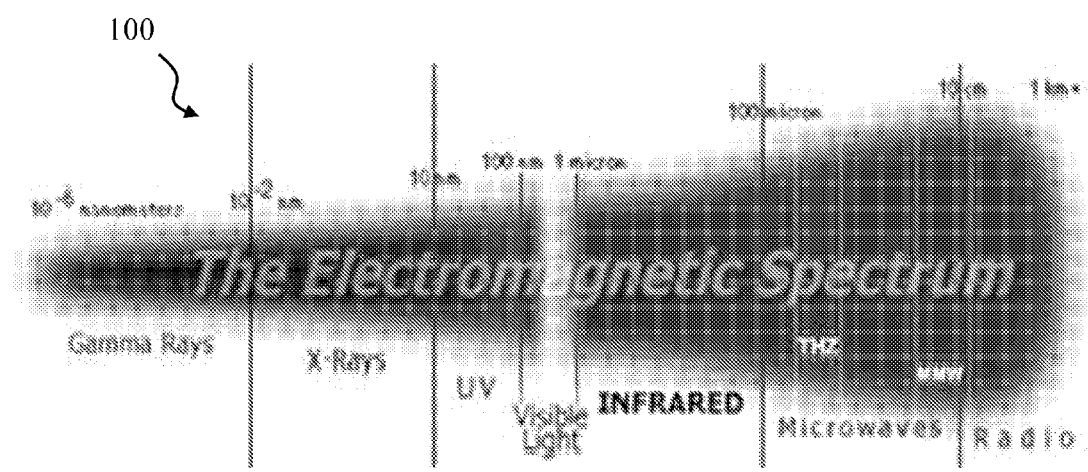
FIG. 1 is a representative image of the electromagnetic spectrum.

In the following detailed description of the preferred embodiments, reference is made to the accompanying drawings, which form a part thereof, and within which are shown by way of illustration specific embodiments by which the system may be practiced. It is to be understood that other embodiments may be utilized and structural changes may be made without departing from the scope of the system.

In a particular embodiment, a system and method for passive multi-spectral imaging is disclosed. The method and system includes provision for imaging, analyzing and displaying imagery from a plurality of passive sensors imaging disparate spectrum conducive to detection of concealed objects.

In one embodiment, the threat detection system is adapted to detect threats posed by pedestrian suicide bombers and the like. In one embodiment, the threat detection system includes a suite of passive sensors adapted to detect radiation spanning the majority of the electromagnetic spectrum.

In one embodiment, the system provides standoff threat detection, allowing a threat to be recognized from a safe distance. As the sensors employed in the currently described embodiment are passive in nature and no transmitters are utilized, the system is particularly adept at long stand-off surveillance where the sensor and operator can be located a safe distance away from danger or at a distance amenable to interdiction. In the preferred embodiment the infrared sensor element of the concealed object detection system can detect the presence of a concealed suicide bomb vest at distances exceeding 100 meters. Moreover, the system provides security forces the ability to detect at standoff ranges and with a high degree of certainty, concealed explosive devices and weapons worn under a person's apparel.

In the preferred embodiment, the plurality of sensors are selected such that their operational imaging ranges are disparate and as complementary to concealed object detection as their disparate imaging spectra. This characteristic extends the imaging range of the multi-sensor system beyond the imaging range of any of its individual sensors, allowing for example the millimeter wave sensor to be most effective at close range, the terahertz sensor to be most effective at medium range and the infrared sensor to be most effective at long range, with range overlap between the sensors as permitted by the imagers, providing a net result of an imaging range 2 or 3 times that of any single sensor.

In another embodiment, the plurality of sensors is selected such that their operational imaging ranges are highly similar allowing concealed object detection at a predetermined range. This characteristic may tend to narrow the range of the multi-sensor system beyond the range of any of its individual sensors, to the range of the tightest range sensor and/or maximum degree of range overlap between sensors. This configuration allows the system to operate at maximum detection effectiveness throughout the narrower imaging range since the majority or entirety of spectral ranges are used simultaneously to perform the concealed object detection function.

The use of sensors whose imaging spectra span across the electromagnetic spectrum of FIG. 1 allows the system to non-invasively detect whether or not a person poses a possible threat at distances exceeding 100 meters due to the presence of an object concealed under the clothing. The system operates over several spectra and all sensors are passive in nature and conform to all related safety regulations as well as avoid detection from electromagnetic detection/snooping devices.

The real time threat detection system includes a plurality of sensors since no existing sensor can perform the task of detecting explosive devices and weapons under all environmental conditions. The "system-of-systems" approach integrates sensors and increases each technology's capabilities exponentially though use of the Automated/Assisted Target Recognition module. Automatic Target Recognition is the machine function (e.g., algorithm) of detecting, classifying, recognizing, and identifying an object without human interaction. Aided Target Recognition is a subset of Automatic Target Recognition in which a human operator interacts with the system and makes some of the decisions. In the preferred embodiment, the invention presently described will include Automatic Target Recognition maximally and Aided Target Recognition as a minimum, and the term "ATR" shall refer to this preferred embodiment.

The ATR module combines the individual detection results of each sensor into a homogeneous detection result providing, amongst other benefits, a voting mechanism where a single sensor detection is weighed less significantly than a multiple sensor (cross-spectrum) detection, which is weighed more significantly. The multiple sensor detection thusly provides increased Pd and reduced Pfa through algorithmic confirmation and collaboration of the results amongst disparate sensors.

Additionally, the ATR module may include algorithms to detect innocuous concealed objects using the imaging results of one or more spectra to cancel or negatively influence the detection results of other spectra sensor results, providing for reduced Pfa.

Additionally through the inclusion of the ATR module, the system may employ a voting mechanism to further increase Pd and reduce Pfa by evaluating the presence or absence, magnitude, size, shape and/or location of multiple collaborating detection results across the multiple sensor spectra.

The system may also include an operator station adapted to display alerts in response to threats detected by the ATR module. The operator station adds a heightened capability in detecting anomalies, explosives and weapons.

Operation/Function

Figure 2:
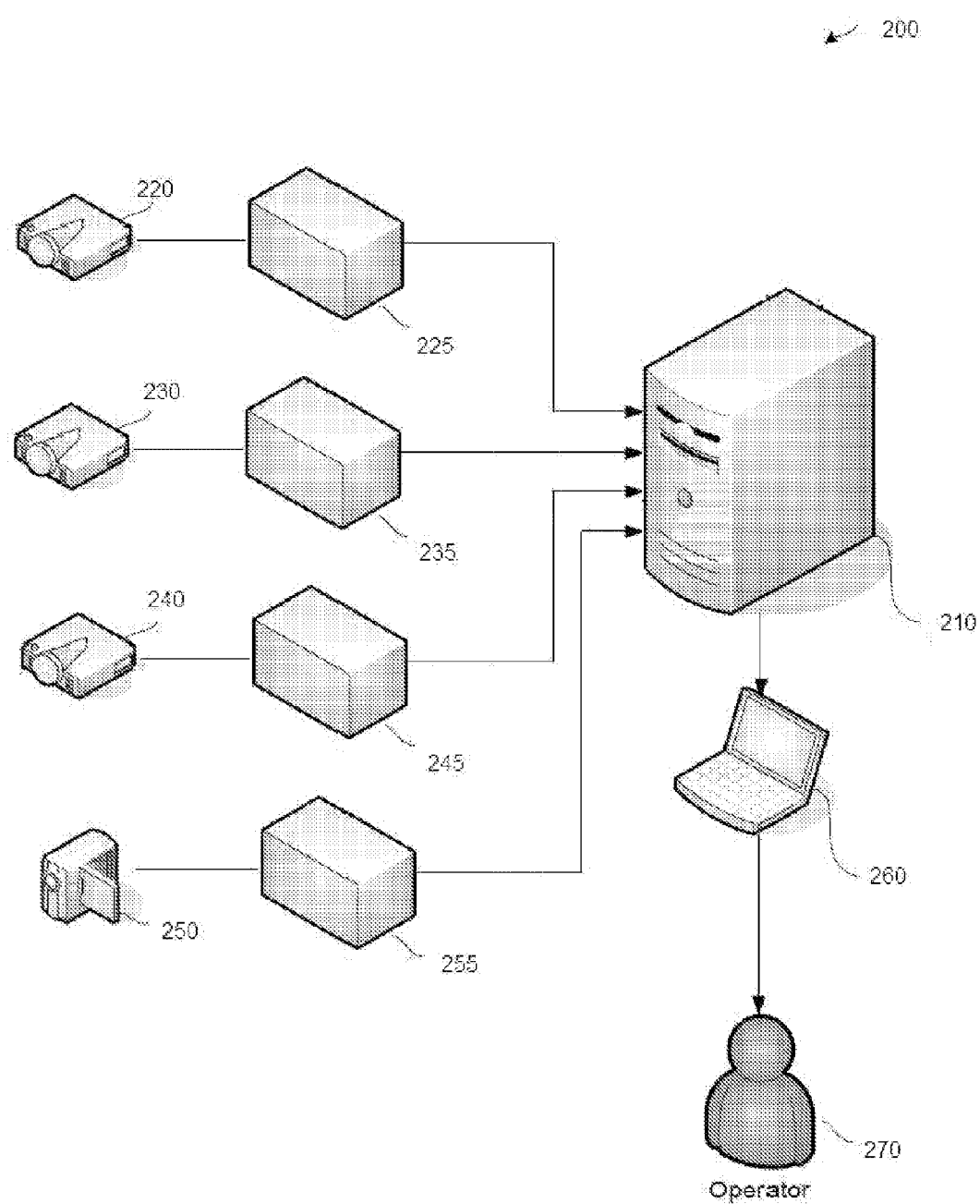
FIG. 2 is a block diagram of a particular embodiment of the hardware components for the inventive system.

A preferred embodiment, shown in FIG. 2, includes a plurality of sensors, preferably mounted on a mobile platform capable of providing electric power and mobility. As shown in FIG. 2, threat detection system 200 includes a terahertz sensor 220, millimeter wave sensor 230, infrared sensor 240, and visible spectrum camera 250 (i.e., CCTV) communicatively coupled to a processing unit 210 via signal converters 225, 235, 245 and 255 respectively. The signal converters 225, 235, 245 and 255 convert the signals from the sensors 220, 230, 240 and 250, respectively, into digital form for processing unit 210. If a particular sensor outputs analog video signals such as RS-170, its respective signal converter would take the form of an Analog to Digital Converter (ADC) image capture device. If a particular sensor outputs Ethernet digital video signals such as Gig-E, its respective signal converter would take the form of an Ethernet channel. Other sensor output formats will require corresponding signal converters.

Signal converters 225, 235, 245, 255 may be external to processing unit 210 or internal to processing unit 210. Additionally, some or all signal converters may be embodied in a single device such as an Ethernet switch or router, multi-channel video capture card or multi-channel video server.

This embodiment represents only an illustrative configuration. For example, the system can be concealed for covert observation and detection in target areas. In contrast, it can be openly displayed as a deterrent, while being used for overt observation and threat detection. The millimeter wave and terahertz sensors used with the system are preferably capable of penetrating (imaging) through drywall and can be easily incorporated into architectural features without compromising effectiveness.

In one embodiment the system utilizes a terahertz sensor adapted to detect radiation in the 5-30 meter range. In the preferred embodiment the terahertz sensor is included into the system as a pre-assembled component acquired from a terahertz sensor manufacturer. The selected sensor is chosen such that its output is updated in real time (15 Hz or more) and formatted using an x-y matrix of image pixels, providing maximal compatibility with the ATR module software. Typically, the magnitude of the terahertz radiation imaged by each pixel within the x-y image matrix is resolved to a value of 0 to 255, where 0 represents a minimal or no terahertz reading for that pixel and 255 represents a maximal or full reading for that pixel.

In one embodiment the system utilizes a millimeter wave sensor operating in the 80-100 gigahertz band of the electromagnetic spectrum. In the preferred embodiment the millimeter wave sensor is included into the system as a pre-assembled component acquired from a millimeter wave sensor manufacturer. The selected sensor is chosen such that its output is updated in real time (15 Hz or more) and formatted using an x-y matrix of image pixels, providing maximal compatibility with the ATR module software. Typically, the magnitude of the millimeter wave radiation imaged by each pixel within the x-y image matrix is resolved to a value of 0 to 255, where 0 represents a minimal or no millimeter wave reading for that pixel and 255 represents a maximal or full reading for that pixel.

In one embodiment the invention utilizes an infrared sensor operating in the 3-5 μm band, the 8-12 μm band, or both. In the preferred embodiment the infrared sensor is included into the system as a pre-assembled component acquired from an infrared sensor manufacturer. The selected sensor is chosen such that its output is updated in real time (15 Hz or more) and formatted using an x-y matrix of image pixels, providing maximal compatibility with the ATR module software. Typically, the magnitude of the infrared radiation imaged by each pixel within the x-y image matrix is resolved to a value of 0 to 255, where 0 represents a minimal or no infrared reading for that pixel and 255 represents a maximal or full reading for that pixel.

Contrasting with terahertz and millimeter wave imagers described above which image the body's natural terahertz and millimeter wave energy emissions through the clothing, infrared sensors detect temperature and temperature differential on the clothing surface.

In the preferred embodiment, the sensor data received from the plurality of sensors is resolved into an x-y image matrix for each sensor, each image matrix consisting of pixel values typically ranging in value from 0 to 255, where 0 represents a minimal or no sensor reading for that pixel and 255 represents a maximal or full sensor reading for that pixel. The pixel values then represent the measure of emitted and/or reflected energy in the scene as viewed by each sensor. In the case of viewing a person with an object concealed underneath their clothing, the pixel values may indicate the contrast difference between one or more pixels viewing portions of the person where no concealed object exists and portions of the person where a concealed object exists.

Figure 3:
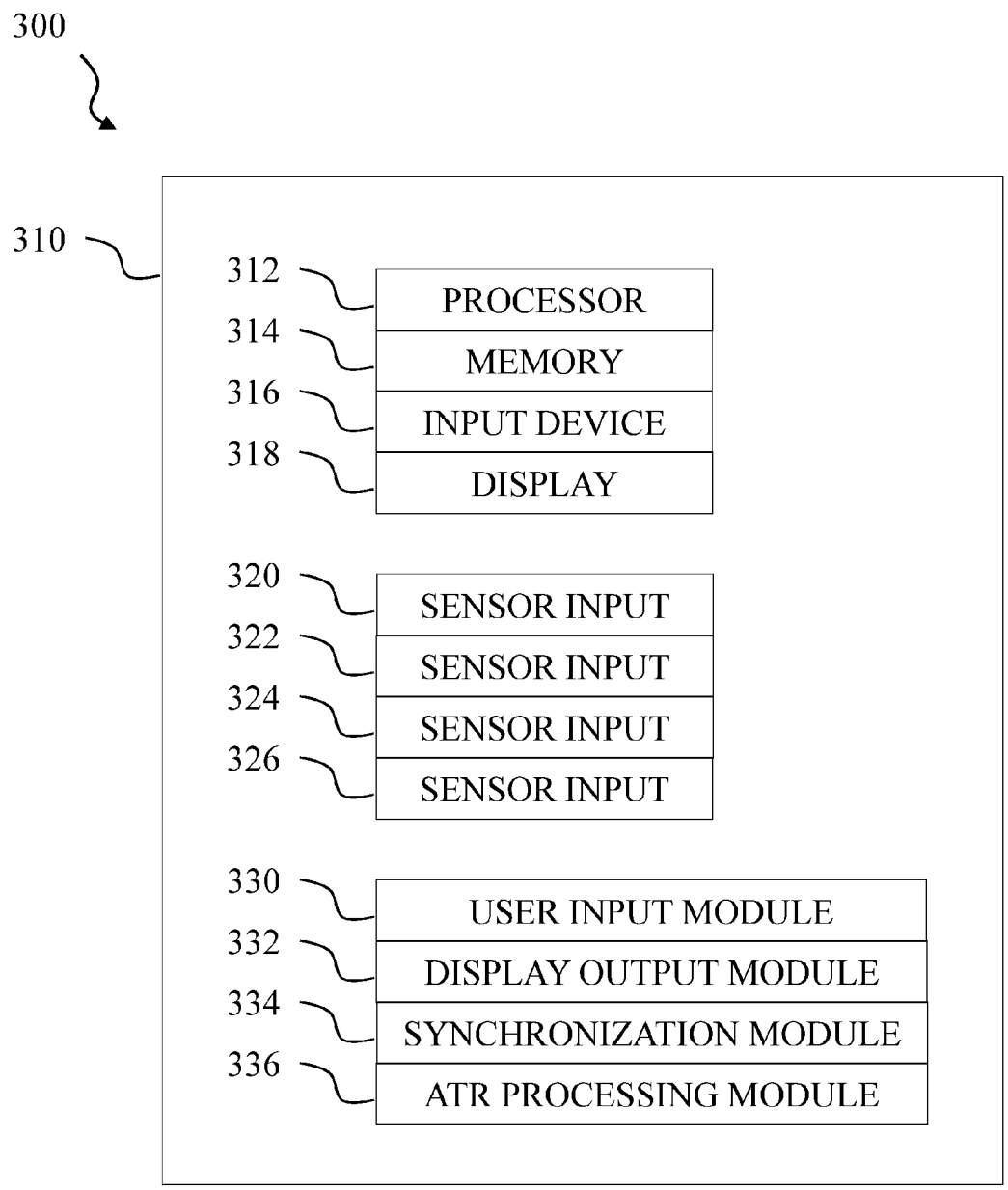
FIG. 3 is a block diagram of a particular embodiment of the computing element for the inventive system.

Referring now to FIG. 3, a block diagram of a particular embodiment of the system is disclosed and generally designated 300. The system 300 includes a computing device 310 having at least one processor 312 and a memory 314 that is accessible to the processor 312. The memory 314 includes media that is readable by the processor 312 and that stores data and program instructions of software modules that are executable by the processor 312.

Additionally, the computing device 310 having at least one means of user input 316, either keyboard, mouse, light pen, track ball, track pad, joystick, graphics tablet, touch screen, or other GUI input device or any combination thereof that is accessible to the processor 312.

Additionally, the computing device 310 having at least one means of user display 318, either a cathode ray tube (CRT) display, liquid crystal display (LCD), light emitting diode (LED) display, plasma display, or other GUI display device that is accessible to the processor 312.

Additionally, the computing device 310 can have a plurality of means of sensor input 320, 322, 324, 326 either frame capture hardware, Ethernet video data transmission, or other sensor input means that is accessible to the processor 312.

Additionally, the processor 312 executes software residing in memory 314 which monitors, processes and reacts to user input from the input device 316 using a user input software module 330, displays operator output and GUI elements to the output device 318 using a display output software module 332, synchronizes the video reception, analysis and display using a synchronization software module 334, and processing the image acquisition, target tracking, target orientation detection, and progressive analysis of occluded areas using a processing software module 336.

Figure 4:
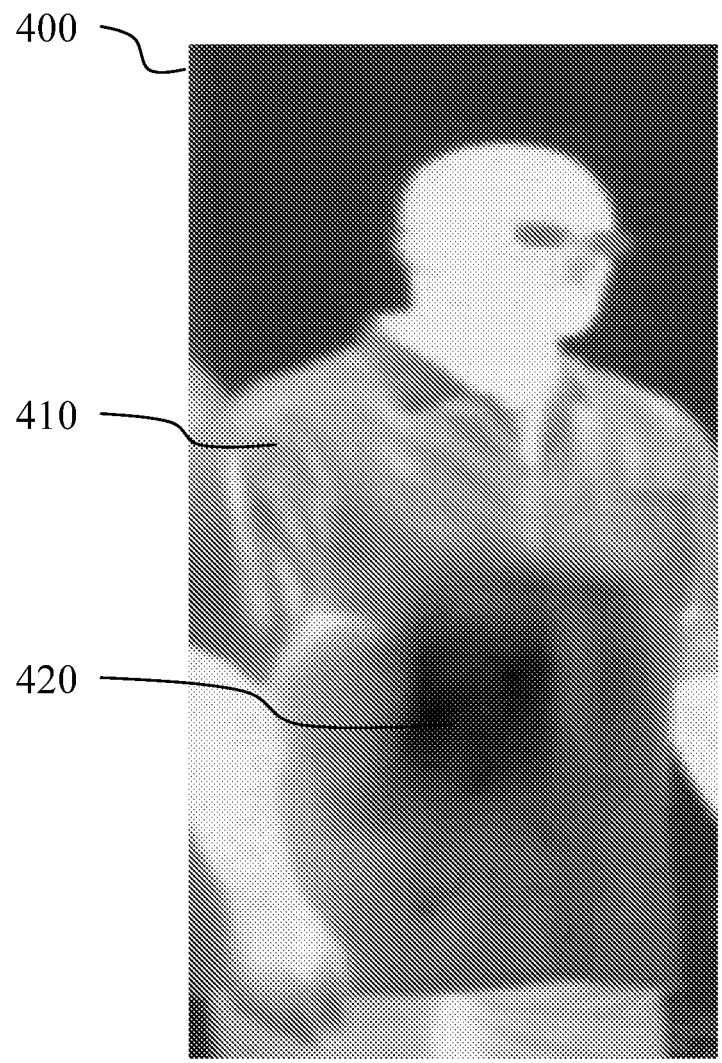
FIG. 4 is an image of an illustrative display from an infrared sensor, showing a person with contrasting threat object concealed under his clothing.

Referring now to FIG. 4, the signal received from one of the plurality of sensors is resolved into an x-y image matrix storing the information as pixel values. The x-y image matrix can then be displayed as pixel data on a display device 400 allowing visualization of the data. Pixels representing non-occluded areas 410 (no concealed object) are indicated with pixel values towards the mid to light range of the gray scale. Pixels representing occluded areas 420 (concealed object) are indicated with pixel values towards the dark range of the gray scale. The pixel value contrast between occluded and non-occluded areas is indicative of the presence of a concealed object 420 which blocks or otherwise attenuates the natural energy emission or reflection of the human body 410. This pixel value contrast can be presented in visual form 400 or as numerical data to a computer algorithm (ATR module described herein) for subsequent automated analysis, or both.

Figure 5:
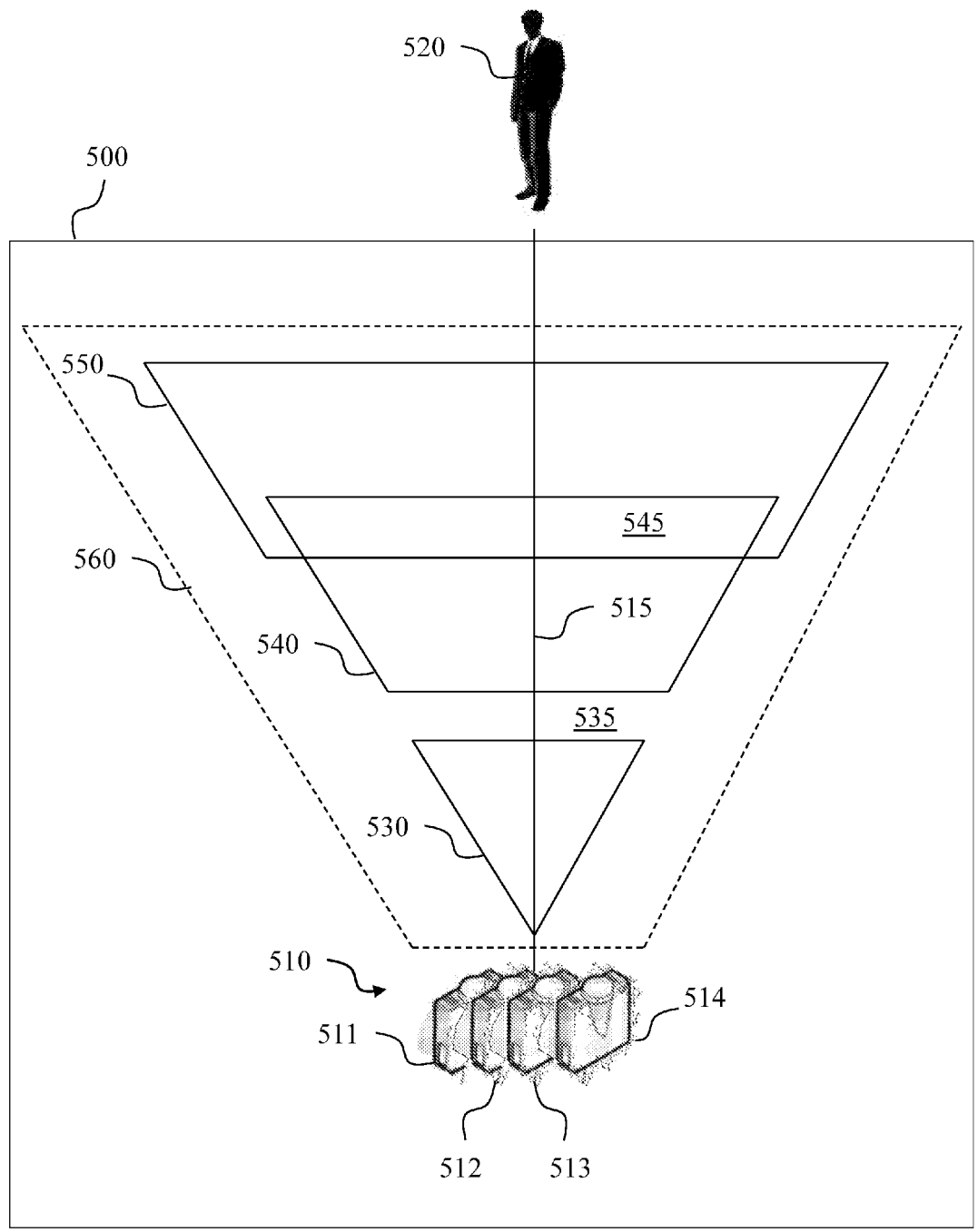
FIG. 5 depicts a top view of the fields of view of disparate sensors.

Referring now to FIG. 5, an illustration of disparate sensor fields of view characteristic of one embodiment of the threat detection system 500 is described. A plurality of sensors generally designated 510 may include terahertz 511, millimeter wave 512, infrared 513 and visible 514 sensors or a combination thereof viewing a subject 520 along a generalized centerline 515. Due to the disparate nature of the sensors 511, 512, 513, 514, imaging subject 520, differences in view angle and focal distance may be exhibited. This property may be capitalized by threat detection system 500 to increase the surveillance range of the system 500 beyond the range of any individual component sensor 511, 512, 513, 514.

As example, the millimeter wave sensor component 512 within the plurality of sensors 510 may exhibit an active imaging area 530 positioned at the shortest distance from the sensors 510. Imaging beyond the millimeter wave sensor's active imaging area 530 is degraded or not effective, limiting the performance of the threat detection system 500. Leveraging the disparate active imaging area 540 of the terahertz sensor 511 and the active imaging area 550 of the infrared sensor 513 increases the range of the threat detection system 500 beyond the capability of any individual sensor.

In a preferred embodiment, one or more of the active imaging areas 530, 540, 550, 560 of sensors 511, 512, 513, 514 may overlap as shown in 545. This provides an enhanced surveillance zone between the sensors providing the overlapped active imaging area 545. In a non-preferred embodiment, one or more of the active imaging areas 530, 540, 550, 560 of sensors 511, 512, 513, 514 do not overlap as illustrated in 535. This would provide a void in the surveillance zone between sensors.

In addition to an increase in range of threat detection system 500 afforded by disparate active imaging areas, a preferred embodiment would leverage differences in viewing angles 530, 540, 550, 560 for sensors 511, 512, 513, 514. As illustrated in FIG. 5, active imaging area 540 for the terahertz sensor 511 and active imaging area 550 for the infrared sensor 513 exhibit contrasting view angles, allowing the threat detection system 500 a wider combined field of view than afforded by any single sensor.

Threat detection efficacy is at a maximum where two or more active imaging areas overlap 545. In these regions 545, the subject 520 can be imaged for concealed threats using a plurality of spectra. This second-look capability increases Pd and lowers Pfa by evaluating the combined detection results of multiple sensors using the ATR module.

In another embodiment of the presently disclosed invention, the sensor exhibiting the largest field of view and/or depth of field can be utilized as a "spotter" sensor, allowing the remaining sensors to automatically slew to movement within the spotter sensor's field of view 560 under control of the ATR Module. This functionality can be implemented physically through addition of electro-mechanical pan-tilt stages attached to the non-spotter sensors or algorithmically by directing the ATR evaluation module software (described herein) to evaluate the region of interest as directed by the target location determined by the ATR software using the spotter sensor, or both.

The effect of overlapping active imaging areas on Pd and Pfa is disclosed in Table 1.

TABLE 1

Pd and Pfa performance gains possible when evaluating the results of a plurality of disparate sensors with overlapping fields of view.

| Sensors | Individual sensor Pd | Individual sensor Pfa | Overlapping Pd | Overlapping Pfa |
|---|---|---|---|---|
| 1 | 90% | 5% | N/A | N/A |
| 2 | 90% | 5% | 99% | 0.25% |
| 3 | 90% | 5% | 99.9% | 0.0125% |

Table 1 lists the resultant joint probability Pd and Pfa of the overlapping active imaging area independent probabilities for 1, 2 and 3 sensors using joint probability formula (1):

$$P(A \text{ and } B) = P(A \cap B) = P(A)P(B) \quad (1)$$

Figure 6:
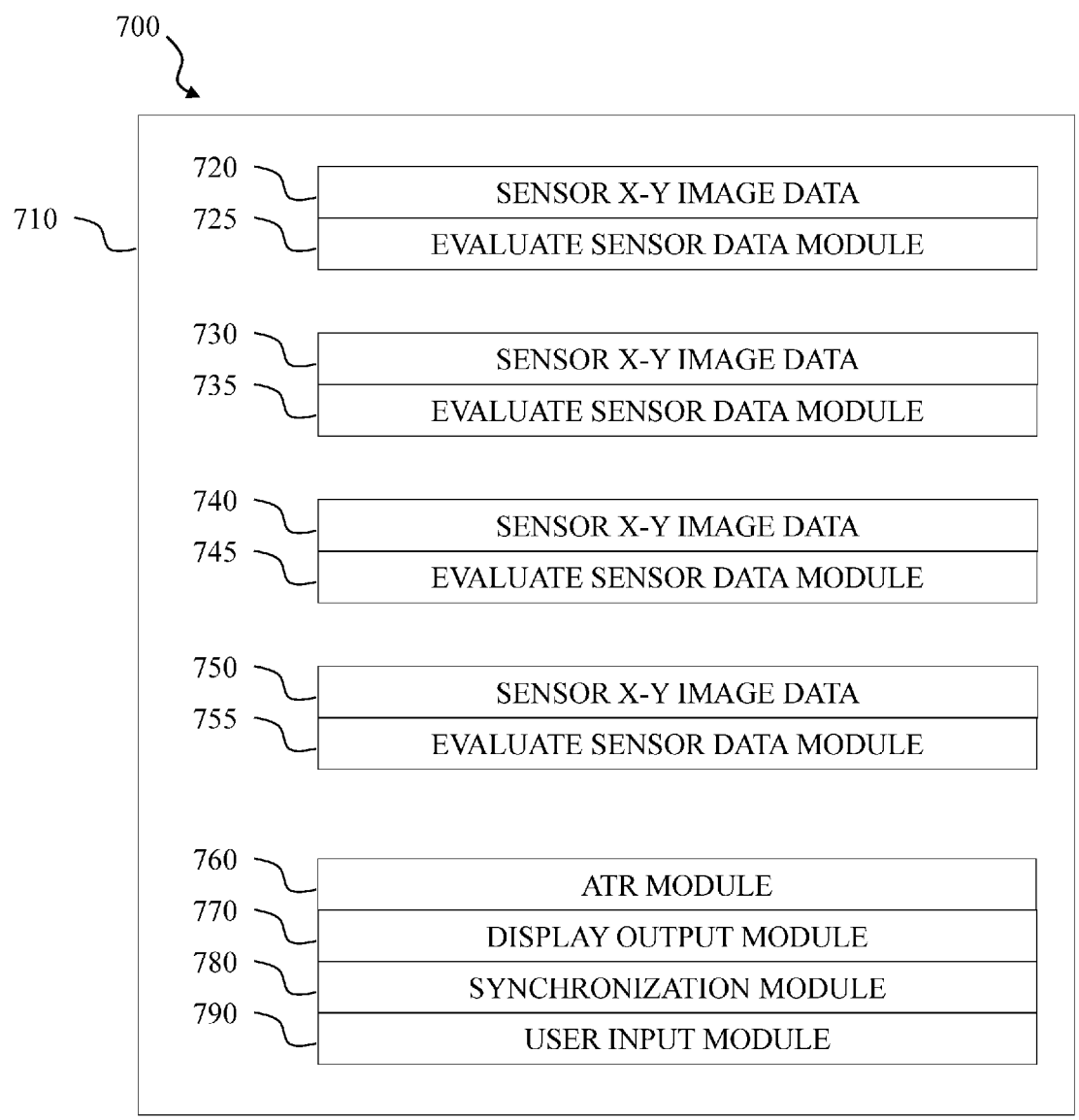
FIG. 6 is a block diagram of the software modules used for automated target recognition ("ATR") threat detection in a particular embodiment of the inventive system.

Referring now to FIG. 6, the ATR module is disclosed. The ATR module is implemented in software or firmware as part of the threat detection system operating software generally denoted as 700. In the preferred embodiment, sensor image data in the form of an x-y image consisting of pixels is received and stored in image data buffers 720, 730, 740, 750, each servicing one spectrum being viewed by a corresponding sensor. For example, image data buffer 720 may store image data from a terahertz sensor, image buffer 730 may store image data from a millimeter wave sensor, image buffer 740 may store image data from an infrared sensor, and image buffer 750 may store image data from a visible spectrum closed circuit television ("CCTV") sensor.

Each of the plurality of image data buffers 720, 730, 740, 750 is analyzed for contrast differences by their respective Evaluate Sensor Data Modules 725, 735, 745, 755 respectively. The Evaluate Sensor Data Modules 725, 735, 745, 755 detect image contrast changes using a variety of computer algorithms examples of which are described below. For objects concealed beneath clothing, the visible spectrum sensor with associated image buffer 750 and Evaluate Sensor Data Module 755 may not yield appreciable detection results.

The individual evaluation results from the Evaluate Sensor Data Modules 725, 735, 745, 755 for each sensor are evaluated in combination by the ATR Module 760. In the preferred embodiment, Synchronization Module 780 insures that the plurality of sensor data represents a time-synchronized representation of the current scene. In this fashion, Synchronization Module 780 guards against disparate imaging instances of time which may affect the precision of the detection results.

Significantly, the ATR Module 760 is responsible for evaluating and weighing the real time sensor results over disparate spectra. In a preferred embodiment, the ATR Module 760 employs a voting mechanism to reinforce or weaken an overall detection decision based on analysis of collaboration between individual sensor detections including but not limited to presence/absence, quantity, magnitude, location, size and shape. This provides significantly increased Pd and reduced Pfa as well as processing the data as an aid to automated target tracking.

Combination of the imaging data and detection results is performed by the Display Output Module 770 which displays the image displays from the plurality of sensors side-by-side on a display screen, optionally including color or otherwise distinctive computer-generated highlights indicative of the threat detected, and maximally combining the image displays from the plurality of sensors using bilinear scaling and warping, alpha blending and/or other established image processing algorithms.

In a preferred embodiment, the Output Module 770 displays a fused interface whereby a plurality of sensor imagery is fused onto one image by the ATR Module 760. For example, the Output Module 770 may use a visible spectrum camera, such as a CCTV video image camera, to create a wide angle field of view image 750 of the scene of interest. Onto that image, the Output Module 770 overlays the bore-sighted narrow field of view terahertz sensor, millimeter wave sensor and/or infrared sensor images in any combination. In this embodiment the operator views only one image and sees the results of the suite of sensors. Detections of threats can be shown as color icons or areas portrayed directly on the image of the person who poses the threat. The sensors are preferably deployed on pan and tilt units so that the operator, or an automatic tracking program controlled by the ATR Module 760 and Synchronization Module 780, can control so as to continue to track the person of interest as the person moves throughout and beyond the current field of view.

The Output Module 770 of the invention shows the images of the suite of sensors. In one embodiment, the Output Module 770 displays data from one to eight sensors on dual 19" screen monitors. As the operator moves the mouse cursor over an image, that image may instantaneously expand (e.g., by a factor of four) in size, and the controls for that sensor may be transferred to the operator's joystick and keyboard. The operator would be able to control the brightness, contrast, pan, tilt and zoom of the chosen sensor.

In another embodiment, the Output Module 770 may create a new artificial image based on the analysis of the current multi-spectral imagery. The artificial image would represent a significance-selected compilation of imagery from the plurality of sensors, combining the highest significance portions of each sensor imagery into a new artificially created image. For example, terahertz imagery of a subject's upper torso, triggered by a positive threat detection assessment from a terahertz sensor for a subject's upper torso, would be combined with millimeter wave imagery of a subject's lower torso, triggered by a positive threat detection assessment from a millimeter wave sensor for the subject's lower torso.

Optimally, operators are trained to identify individuals who possess weapons or explosive devices. Alerts and threat levels generated by the ATR Module 760 via the Display Output Module 770 may be shown on the images and incorporated into the display which is always in the field of view of the operator.

Operator control of the ATR Module 760, including but not limited to sensitivity adjustments and assessment of threat indications, is performed by the User Input Module 790 which communicates commands from the operator via keyboard, mouse, light pen, track pad, track ball or other input device.

In normal operation of the preferred embodiment, the ATR Module 760, and Synchronization Module 780 cause the Display Output Module 770 to display the combined imaging and threat detection information. For automatic target recognition operation, the ATR Module 760 activates an alarm output to signal the presence of a concealed threat. For aided target recognition operation, the Display Output Module 770 displays the imagery and/or detection information to a trained operator who uses his or her judgment in combination with the inventive system to detect hidden threats.

Figure 7:
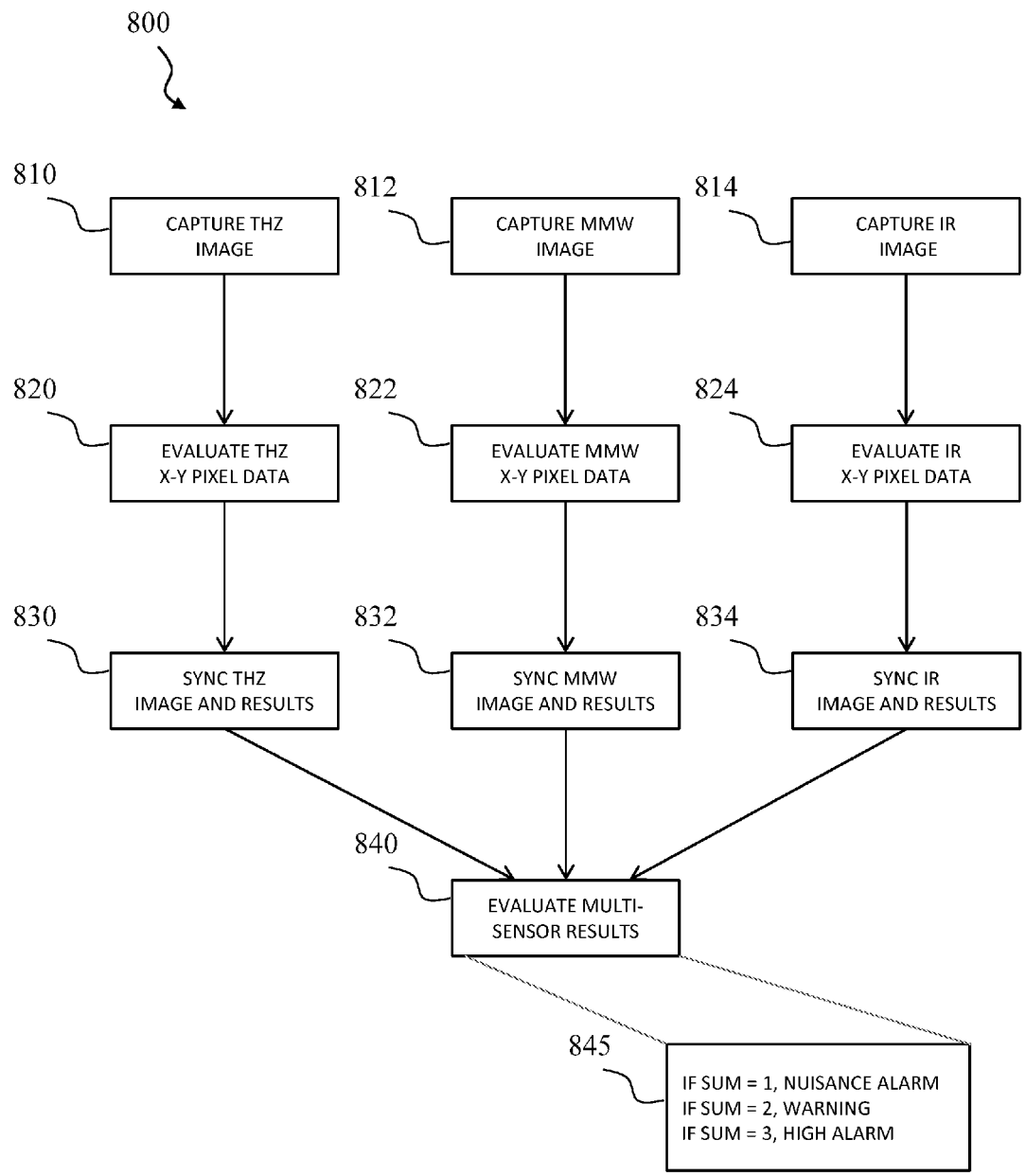
FIG. 7 is a flow chart of one embodiment of the ATR Module software.

Referring now to FIG. 7, a flow chart of the ATR Module for one particular embodiment is disclosed and generally designated 800. Image capture algorithms 810, 812, 814 capture imagery from the plurality of disparate sensors. In the illustrated example, image capture algorithms 810, 812, 814 capture and store the imagery from terahertz, millimeter wave and infrared sensors respectively. Imagery is stored in an x-y memory buffer of pixels.

Once the images are captured by image capture algorithms 810, 812, 814, the imagery is evaluated by ATR algorithms 820, 822, 824 respectively. The three separate algorithms allow for differing algorithms should they be required for the disparate image data. For instance, an algorithm to detect threats using infrared imagery may be different than an algorithm to detect threats using terahertz imagery. The separate algorithms also accommodate differing image sizes, aspect ratios, zoom/scaling ratios, translation and/or rotation, and format differences amongst the sensor data.

Once the ATR algorithms 820, 822, 824 evaluate the captured image data 810, 812, 814, the Synchronization algorithms 830, 832, 834 synchronize the imagery and ATR algorithm evaluation results allowing for possibly differing frame rates and integration times for the plurality of sensors. In one embodiment, the Synchronization algorithms emulate sample-and-hold circuitry common in the field of analog circuitry design.

Once the imagery and ATR evaluation results have been synchronized by the Synchronization algorithms 830, 832, 834, the results are evaluated in combination by the ATR post-process algorithms 840. The ATR post-process algorithms 840 evaluate the combination of individual ATR results compiled by individual sensor ATR algorithms 820, 822, 824.

In one embodiment where the sensor ranges overlap, the ATR post-process algorithms 840 utilize the simple polling scheme 845. Polling scheme 845 adds the number of threat detections from the individual ATR algorithms 820, 822, 824. If the sum is 0, no threat is detected on any sensor and the person is deemed safe of threats. If the sum is 1, only a single sensor of the three sensors has detected a threat and the result is deemed a nuisance alarm, increasing Pfa. If the sum is 2, two disparate sensors agree to the presence of a threat and an alarm is generated. If the sum is 3, all sensors agree to the presence of a threat, generating a high alarm condition, increasing Pd.

In another embodiment, the Polling scheme 845 is improved by comparing not just the presence of an alarm condition but additionally other germane factors such as alarm location on the body, alarm size, alarm intensity, or any combination thereof.

In another embodiment, the Polling scheme 845 is improved by grouping similar sensor results. For example, the imagery from both terahertz and millimeter wave sensors can penetrate clothing whilst infrared sensors cannot. Therefore, agreement between terahertz and millimeter wave sensors is a significant event and cause for alarm concealed objects under clothing.

In yet another embodiment, the Polling scheme 845 is improved through recognition by one or more of the individual ATR algorithms 820, 822, 824 of an innocuous object. Should this be observed, the effected individual ATR algorithms 820, 822, 824 would impart a negative effect on the holistic Polling scheme 845, eliminating or reducing the significance of any positive detection results from the remaining ATR algorithm results.

Referring now to FIG. 8, several examples of concealed threat detection algorithms are disclosed, implemented in C#. For example a first algorithm (910) discloses counting the instances of image pixels outlying an acceptable gray scale range. A count exceeding a threshold setting causes the "objectDetected" flag to be set.

A second algorithm (920) discloses summing the gray scale magnitudes of pixels outlying an acceptable gray scale range. A sum exceeding a threshold setting causes the "objectDetected" flag to be set.

A third algorithm (930) discloses counting the instances of image pixels outlying an acceptable gradient limit. A count exceeding a threshold setting causes the "objectDetected" flag to be set.

Referring now to FIG. 9, an example of concealed threat detection voting/weighing algorithms 1010 are disclosed, as implemented in C#. The algorithms involve counting the instances of individual detection events as reported by the separate concealed threat detection algorithms for each spectrum's sensor, namely terahertz, millimeter wave and infrared. The sum of the algorithms detecting a concealed object indicates the detection alarm level on a scale of 0 (none) to 3 (high alarm).

Also referring to FIG. 9, an example of an alpha blending algorithm 1020 is disclosed, as implemented in C#. This algorithm may, in one embodiment, be used by the Display Module for combining the video outputs from the terahertz, millimeter wave, infrared and visible sensors into a single video display output.

Figure 10:
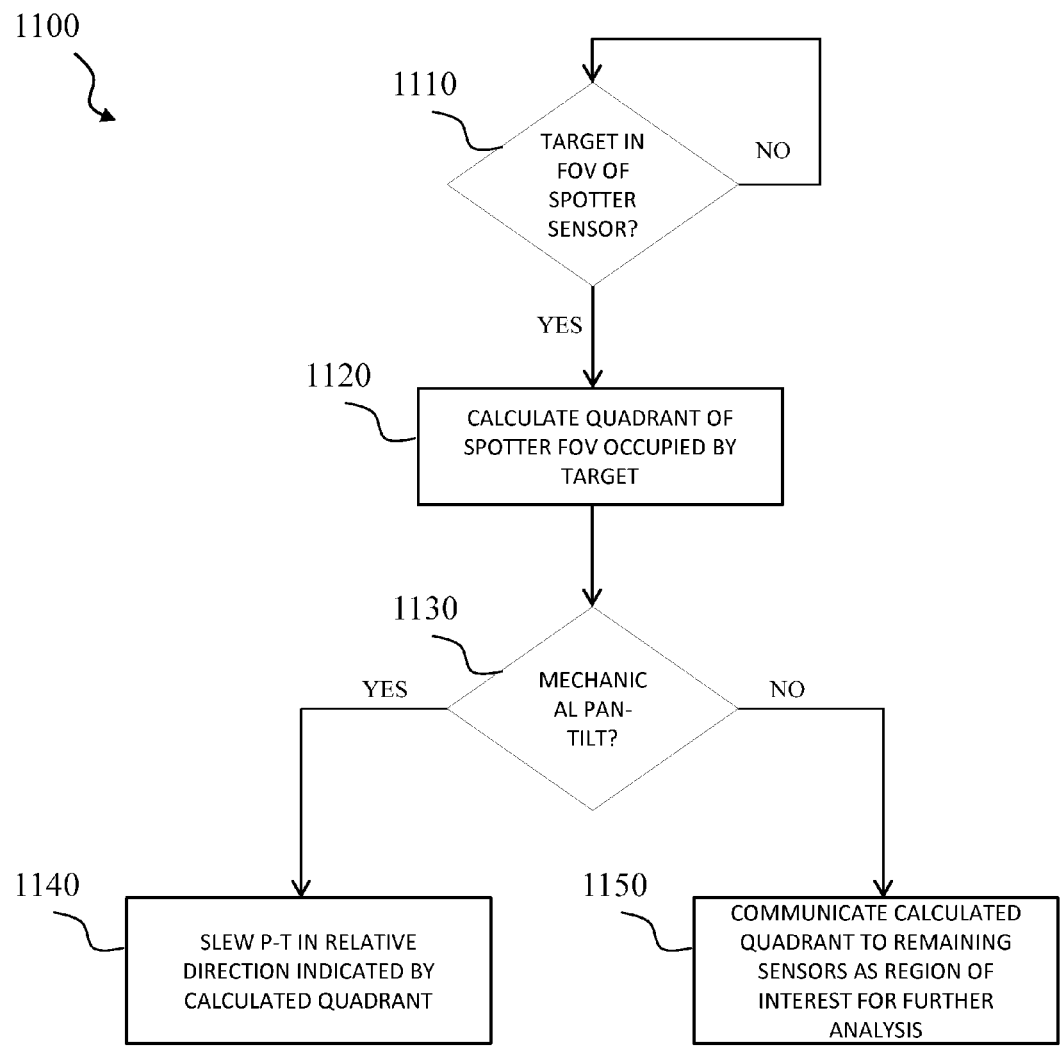
FIG. 10 is a flow chart of one embodiment of slewing sensors/analysis to a region of interest determined by a spotter sensor.

Referring now to FIG. 10, an example of slewing the sensors of a concealed threat detection system to a target of interest under surveillance of a spotter sensor is disclosed and generally designated 1100. In another embodiment of the presently disclosed invention, the sensor exhibiting the largest field of view and/or depth of field can be utilized as a "spotter" sensor, allowing the remaining sensors to automatically slew to movement within the spotter sensor's field of view under control of the ATR Module. Step 1110 determines if a target of interest is within the field of view of the spotter sensor. Once a target of interest is algorithmically detected, step 1120 calculates the quadrant of the spotter sensor field of view occupied by the target. For remaining sensors equipped with electro-mechanical pan-tilt stages, in step 1140 the sensor is slewed to the relative direction indicated by the calculated quadrant of step 1120. For remaining sensors that are fixed (no pan-tilt stage), in step 1150 the quadrant occupied by the target calculated in 1120 is communicated to subsequent analysis algorithm(s) as the region of interest for the analysis.

This functionality can be implemented physically through addition of electro-mechanical pan-tilt stages attached to the non-spotter sensors or algorithmically by directing the ATR evaluation module software (described herein) to evaluate the region of interest as directed by the target location determined by the ATR software using the spotter sensor, or both.

GLOSSARY OF CLAIM TERMS

Acceptable range of gray scale pixel values: This term is used herein to refer to a preset or pre-determined range of pixel values seen in a particular image carrying only intensity information. If a target, when seen in gray scale within the electromagnetic spectrum, falls within this range, the target is presumed to not have a concealed threat. If any portion of the target falls outside this range, the portion may indicate presence of a concealed threat.

Activate: This term is used herein to refer to actuating, turning on or stimulating a response. For example, an alarm output may be "activated" by manually by user input or automatically by detection of a contract change/concealed threat on a target.

Aided target recognition: This term is used herein to refer to a module combining the heterogeneous detection results of each sensor in the threat detection system into a homogeneous detection result. Among other features, the module also can weigh the significance of individual or combined detection results, and/or can use its algorithms to indicate the presence of a concealed threat.

Alarm output: This term can be used interchangeably herein with "alert" to refer to any signal, warning or response to a stimulus. The "alarm output" should be identifiable by a human being or machine when released. For example, if contrast changes are detected on a target's image, an alarm output may be automatically released to signal the possible presence of a concealed threat.

Algorithm: This term is used herein to refer to a precise step-by-step plan for a computational procedure that begins with an input value and yields an output value in a finite number of steps. The operation may be used to solve a problem or be processed repeatedly.

Analysis: This term is used herein to refer to an evaluation or process of assessing the individual components of an image or set of data to reach a particular conclusion or calculate a successive set of data. For example, the pixel data of a target's image can be "analyzed" to determine the possible presence of a concealed threat. In another example, a real-time display or image can be "analyzed" to produce an artificial image for subsequent evaluation.

Artificial image: This term is used herein to refer to a non-real-time display of a target created from the real-time display of the target. An "artificial image" can be useful for future analysis and evaluation to determine presence of a concealed threat, or lack thereof.

Assign: This term is used herein to refer to attributing a status or rank to a particular image or sorting the image into predefined groups. For example, a target's image can be "assigned" a ranking of low, medium, or high, referring to low risk, medium risk, or high risk of presence of a concealed threat.

Attenuate: This term is used herein to refer to reducing the value, scale or degree of pixels seen in an image, the pixels resulting from the target's naturally emitted infrared energy. Blocked or "attenuated" infrared energy can indicate the presence of a concealed threat.

Band: This term is used herein to refer to the wavelengths or frequency levels along an electromagnetic spectrum. Generally, a sensor can detect radiation along a particular "band" of the electromagnetic spectrum.

Camera: This term is used herein to refer to any device that can record still or moving objects in the visible light band of the electromagnetic spectrum.

Communication: This term is used herein to refer to the capability of transferring, transmitting or conveying information or data between two apparatuses. Thus, a sensor in "communication" with a computer or software is capable of transmitting or conveying information or data to that computer or software.

Corresponding: This term is used herein to refer to two entities having a related, overlapping relationship (as kind, degree, position, correspondence, or function). For example, a terahertz band and a terahertz sensor are "corresponding" entities since they are related by a particular frequency in the electromagnetic spectrum.

Detect: This term is used herein to refer to discovering, identifying, or determining the existence or presence of anything, including, but not limited to, a substance, energy, image, threat, and object, by manual and/or automated (e.g., computational) means.

Electromagnetic spectrum: This term is used herein to refer to the entire range of wavelengths of all known electromagnetic radiations, including gamma rays, X-rays, ultraviolet rays, visible light rays, infrared rays, microwaves, and radio waves. Various frequencies are also found along the electromagnetic spectrum and can be detected by corresponding sensors.

Energy: This term is used herein to refer to electromagnetic radiation detectable along its spectrum by a plurality of sensors. "Energy" may be emitted naturally from a target's body or may be emitted by a substance located on the person of the target.

Exceed: This term is used herein to refer to a value surpassing, going beyond, or extending outside of a predetermined limit. For example, if detected pixel values outlying an acceptable range of gray scale pixel values "exceed" a threshold value (i.e., limit), a sufficient contrast change may exist to indicate the presence of an object or concealed threat.

Expand: This term is used herein to refer to enlarging, zooming in on, or maximizing a segment of a display.

Gradients: This term is used herein to refer to a range of position-dependent colors along a gray scale. Differences in color "gradients" on a target may indicate contrast changes and the presence of a concealed threat.

Gray scale levels: This term is used herein to refer to the brightness of position-dependent colors along a gray scale. Energy attenuated by a concealed threat can attenuate or block the naturally emitted energy, thereby effecting "gray scale level" or brightness of color emitted by the target.

Heterogeneous: This term is used herein to refer to images or sensors diverse in kind or nature. For example, a plurality of "heterogeneous" sensors includes diverse sensors, such as a terahertz sensor and a millimeter wave sensor, such that they detect energy in different bands of the electromagnetic spectrum. A plurality of "heterogeneous" sensors can record a plurality of "heterogeneous" images in the different bands of electromagnetic spectrum.

Homogeneous: This term is used herein to refer to images that are alike, similar or of the same kind. A plurality of heterogeneous images can be combined via a software application to form a single, "homogeneous" image.

High alarm: This term is used herein to refer to a maximum alert for detection of a possible concealed threat. A "high alarm" may be released based on the overlapping recordings of a relatively high number of sensors (e.g., all or almost all).

Highly significant aspect: This term is used herein to refer to the notable areas of interest on an artificial image. Notable areas of interest may be pre-determined by a user or automatically chosen by computer software, for example by calculating contrast changes of the target.

Image contrast changes: This term is used herein to refer to a difference in lightness, brightness and/or hue between two colors that makes the colors more or less distinguishable. An "image contrast change" can indicate the attenuation or blocking of infrared energy emitted front a target's body, thereby signifying the presence of a concealed threat.

Image data buffer. This term is used herein to refer to a storage unit of image data in a particular band along the electromagnetic spectrum. Thus, generally one "image data buffer" corresponds to one sensor recording energy in that band.

Image data: This term is used herein to refer to the pixel information of a target recorded by a sensor or camera. "Image data" can be analyzed, manipulated and combined in a variety of ways, including by computer software and the aided target recognition, to determine whether a possible concealed threat is present on a target.

Imagery: This term is used herein to refer to the overall depiction of a sensor's recording of a target within the sensor's band. Contrast changes seen in the "imagery" may indicate presence of a concealed threat on the person of the target.

Incorporate: This term is used herein to refer to including information as part of a display. For example, if a target has known threat levels or has a contrast change assigned to a particular status, the threat level or status may be "incorporated" into the homogenous image on the display of the target by depicting the threat level or status on the display.

Infrared: This term is used herein to refer to electromagnetic radiation with wavelengths longer than the wavelengths of visible light. A sensor and a band may correspond relative to the "infrared" wavelengths of the electromagnetic spectrum.

Integrated: This term is used herein to refer to an arrangement made up of a plurality of parts composed and coordinated to form a whole. Thus, a plurality of sensors can be "integrated" to form a whole, synergistic arrangement for recording targets and detecting concealed threats.

Intermediate alarm: This term is used herein to refer to a moderate alert for detection of a possible concealed threat. An "intermediate alarm" may be released based on the overlapping recordings of one or more sensors.

Isolate: This term is used herein to refer to selecting a target-of-interest within the environment of display. A spotter sensor may "isolate" and enhance a target if the spotter sensor individually determines that the target may contain a concealed threat.

Manual control: This term is used herein to refer to a user or operator's ability to direct the movement of one or more devices, such as a sensor.

Maximum overlapping imaging distances: This term is used herein to refer to the sensors having imaging areas that overlap maximally to allow a higher probability of detection and lower probability of false alarm since multiple sensors can scan a single target in a particular area.

Millimeter wave: This term is used herein to refer to the highest radio frequency band within the electromagnetic spectrum. A sensor and a band may correspond relative to the "millimeter wave" frequencies of the electromagnetic spectrum.

Minimal overlapping imaging distances: This term is used herein to refer to the sensors having imaging areas that overlap minimally but tangentially (or with minimal gaps) to allow for a larger range of coverage of the sensors.

Mobile operator station: This term is used herein to refer to any location or post with a display adapted to display alerts in response to concealed threats detected by the aided target recognition module via the plurality of sensors.

Mouse cursor: This term is used herein to refer to any pointer of stimulus that activates a response on a computer display. For example, if a "mouse cursor" is placed over a portion of a display, that portion may be expanded to facilitate viewing by the operator.

Naturally emitted: This term is used herein to refer to any energy released by a target's body solely due to the target's body. Thus, millimeter wave energy that is "naturally emitted" from a target's body is not emitted because of any concealed threat, but because of the body's own ordinary processes.

Nuisance alarm: This term is used herein to refer to any low level alarm or alert based on the detection of a threat by a relatively low number of sensors (e.g., one sensor). Generally, a "nuisance alarm" is associated with a higher probability of false alarm.

Object: This term is used herein to refer to any inanimate substance carried by a target over top or underneath the target's clothing. If the "object" is considered dangerous/harmful and is underneath the target's clothing, the object may be referred to as a "concealed threat".

Operator: This term is used herein to refer to any user of the threat detection system or any part of the system thereof.

Outlying: This term is used herein to refer to a value determined to be outside a range of threshold values or predetermined values. For example, if there determines to be a gray scale pixel value "outlying" an acceptable range of gray scale pixel values, then the outlying pixel value may indicate presence of a concealed threat.

Passive sensor: This term is used herein to refer to a device that detects natural radiation that is emitted or reflected by a target and/or surrounding areas.

Portion: This term is used herein to refer to any allocated part of an image or display that can be manipulated via expansion, compression, editing, etc. Thus, when a "portion" of a display or image is expanded, only that particular part of the display or image is expanded.

Presence: This term is used herein to refer to the part of space within the immediate vicinity of a target. Thus, if a concealed threat is deemed to be "present", it is within the immediate vicinity of the target carrying the concealed threat. "Presence" of a concealed threat can be indicated by contrast changes seen in images of the target.

Probability of detection: This term is used herein to refer to the likelihood that an object has been discovered, identified, or determined. Thus, if a "probability of detection" is high, the probability of false alarm is low and there is a high likelihood that an object (e.g., concealed threat) has been detected on a target.

Probability of false alarm: This term is used herein to refer to the likelihood that an object has not been discovered, identified, or determined, but an operator may be alerted of a contrast discrepancy anyway. Thus, if a "probability of false alarm" is high, the probability of detection is low and there is a low likelihood that an actual object (e.g., concealed threat) has been detected on a target.

Radiation: This term is used herein to refer to the process of emitting or shooting forth energy from a point or surface in the form of electromagnetic waves. "Radiation" can have a range of wavelengths and frequencies capable of being detected by differing types of sensors.

Relative differences in contrast: This term is used herein to refer to the discrepancy between a target image's overall contrast and contrast of any portion of the target's image. Thus, "relative differences in contrast" can define image contrast changes if, for example, a sufficient discrepancy exists between a target image's overall contrast and the contrast of that target image's abdominal portion. If the contrast, color gradient, pixel values, etc. of the abdominal portion are sufficiently different from the remainder of the target's body, then an image contrast change may exist.

Signal: This term is used herein to refer to indicating the presence of an object or substance on a target. Thus, when an alarm is outputted to "signal" the presence of a concealed threat, the alarm is indicating the presence of that concealed threat.

Slew: This term is used herein to refer to rotate, turn, pivot or otherwise manipulate a device about its axis. Thus, a sensor may be manually or automatically slewed to identify and/or isolate a portion of a target's body to further analyze or ascertain the presence of a concealed threat.

Spotter sensor. This term is used herein to refer to a sensor of the plurality of sensors that exhibits that largest field of view and/or depth. Thus, a "spotter sensor" can provide a broader surveillance of the target and surroundings, and if any image contrast change is detected, the remainder of the plurality of sensors can be automatically or manually tilted to focus on that image contrast change.

Status: This term is used herein to refer to a rank, category or significance of a detected contrast change. Thus, a contrast change can be given a "status" according to the number of sensors that detected that contrast change. The fewer the number (and/or types) of sensors that detected the contrast change, the lower status the contrast change may receive, and vice versa.

Sum of pixels: This term is used herein to refer to the number and type of pixels that may appear on a target's image or a portion thereof. The "sum of pixels" of a portion of a target's image may differ from the remainder of the target's image to the extent of indicating the presence of a concealed threat.

Synchronize: This term is used herein to refer to arranging or harmonizing a series of data into a single output. Therefore, a plurality of images that represent different sets of data can be "synchronized" into one display that substantially represents each set of data collectively.

Target tracking: This term is used herein to refer to the ability to isolate and/or detect a target-of-interest and/or an image contrast change on a target. "Target tracking" may be incorporated into software that defines the parameters of a contrast change.

Target: This term is used herein to refer to any inanimate entities (i.e., a box) or animate entities (i.e., a human being) that are a subject of analysis for presence of a concealed threat using embodiments of the present invention.

Terahertz: This term is used herein to refer to a unit of measurement based on one trillion hertz.

Threat detection system: This term is used herein to refer to an apparatus or coordination of sensors and software adapted to detect radiation across the electromagnetic spectrum with an objective of detecting an anomalous signature on a target by analyzing contrast changes on the target.

Threat level: This term is used herein to refer to a ranking of danger of a target based on an automated or human analysis of any contrast changes detected on a target. Thus, where a target is detected to have significant contrast changes, the target may appear on a display with a relatively high "threat level".

Concealed threat: This term is used herein to refer to an anomalous signature underneath the clothing of or otherwise obscured within a target. Examples of "concealed threats" include, but are not limited to, hidden weapons, bombs, IEDs, protective vests, drugs, and other objects that are terroristic, illegal or otherwise indicate potential danger.

Threshold value: This term is used herein to refer to a predetermined degree by which the contrast of a portion of a target's image may differ from the contrast of the remainder of the target's image. Thus, for example, if the gray scale pixel values of the abdominal region of a target's image differ from the acceptable range of gray scale pixel values of the remainder of the target's image by more than the "threshold value", the presence of a concealed threat may be indicated.

Time-synchronized representation: This term is used herein to refer to a single display or representation depicting a series of data that were produced at the same time, at the same rate, or in a time-coordinated manner. Thus, if three sensors each record a contrast change at the same time, each recordation can be overlaid or harmonized into a "time-synchronized representation".

Transfer: This term is used herein to refer to arranging for a device or function to be controlled by or transmitted to another entity. Thus, if the function of control of a sensor is transferring from an aided target recognition module to an operator, control is "transferred" to the operator.

Unenclosed: This term is used herein to refer to not being contained, surrounded or confined in three-dimensional space. Thus, when an area or region is "unenclosed", the region is not limited in three-dimensional space.

Variable: This term is used herein to refer to anything that is subject to changing or marked by diversity or differences. For example, an environment can be "variable" because it is subject to changes in that environment, and that environment may differ from other environments suitable for embodiments of the current invention. In another example, the distances at which sensors are disposed within an environment or target area may also be "variable" since each sensor can be disposed at a different distance.

Visible: This term is used herein to characterize the band of the electromagnetic spectrum that is visible to the human eye or a camera.

X-Y image of pixels: This term is used herein to refer to a two-dimension Cartesian coordinate system written as an ordered pair characterizing the pixels of an image. Thus, if the format of image data is in an "X-Y image of pixels", the image data can be quantified two-dimensionally and be analyzed with other quantified image data.

It will be seen that the advantages set forth above, and those made apparent from the foregoing description, are efficiently attained and since certain changes may be made in the above construction without departing from the scope of the embodiments, it is intended that all matters contained in the foregoing description or shown in the accompanying drawings shall be interpreted as illustrative and not in a limiting sense.

It is also to be understood that the following claims are intended to cover all of the generic and specific features of the embodiments herein described, and all statements of the scope of the disclosure which, as a matter of language, might be said to fall there between. Thus, the present disclosure is not intended to be limited to the embodiments shown herein but is to be accorded the widest scope possible consistent with the principles and novel features as defined by the following claims.

What is claimed is:
1. A threat detection system comprising:
a processor;
a memory coupled to the processor and having a plurality of image data buffers;
a display coupled to the processor;
a plurality of integrated passive sensors coupled to the processor; and
the processor configured to
receive image data in a format of a plurality of pixels from the plurality of integrated passive sensors operating within at least two spectral bands, store the image data in the plurality of image data buffers, each image data buffer storing the image data of a different spectral band,
transmit a synchronized representation of the image data from the plurality of integrated passive sensors to the display,
detect relative differences between image contrast values of the plurality of pixels within each image data buffer,
assign a particular status as a result of detecting the image contrast values within a portion of the image data exceeding a threshold indicating a probability of a concealed object, and
select an alarm signal to transmit to an alarm based on the particular status defined by the probability of the concealed object.

2. The threat detection system of claim 1, wherein the display comprises one of a liquid crystal display, a light emitting diode display, and plasma display.

3. The threat detection system of claim 1, further comprising an alarm coupled to the processor.

4. The threat detection system of claim 1, wherein the plurality of integrated passive sensors are configured to detect radiation of the at least two different spectral bands at variable distances.

5. The threat detection system of claim 1, further comprising a video camera configured to transmit visible light imagery to the processor to correlate with the synchronized representation of the image data.

6. The threat detection system of claim 5, further comprising an aided target recognition module in communication with the camera and the plurality of integrated passive sensors configured to integrate the visible light imagery with the image data.

7. The threat detection system of claim 1, wherein the plurality of integrated passive sensors includes at least one of terahertz sensor, a millimeter wave sensor, and an infrared sensor to define the image contrast values.

8. The threat detection system of claim 6, wherein the aided target recognition module is further configured to detect changes in radiated terahertz energy, millimeter energy, and infrared energy corresponding to the concealed object on a target.

9. The threat detection system of claim 1, wherein the processor is further configured to
determine an acceptable range of gray scale pixel values based on the image data, and
perform a computational analysis on the image data to detect the concealed object under clothing of a target as a result of a sum of pixels, gray scale levels, or gradients exceeding or outlying an acceptable range of gray scale pixel values by a threshold value.

10. The threat detection system of claim 1, wherein the alarm comprises at least one of a visual alarm, audible alarm, sensory alarm, mechanical alarm, electronic alarm, and digital alarm.

11. The threat detection system of claim 1, wherein the plurality of integrated passive sensors each having a different imaging distance range to increase a collective range that is greater than a respective imaging distance range of a given integrated passive sensor operating alone.

12. A method of detecting concealed threats on a target, the method comprising:
receiving image data at a memory from a plurality of integrated passive sensors operating within at least two spectral bands, the image data in a format of a plurality of pixels;
storing the image data in a plurality of image data buffers of the memory, each image data buffer storing the image data of a different spectral band;
transmitting a synchronized representation of the image data from the plurality of integrated passive sensors to a display using a processor coupled to the memory;
detecting relative differences between image contrast values of the plurality of pixels within each image data buffer using the processor;
assigning a particular status using the processor as a result of detecting the image contrast values within a portion of the image data exceeding a threshold indicating a probability of a concealed object; and
selecting an alarm signal using the processor based on the particular status defined by the probability of the concealed object.

13. The method of claim 12, wherein the plurality of integrated passive sensors are configured to detect radiation of the at least two different spectral bands at variable distances.

14. The method of claim 12, further comprising transmitting visible light imagery to the processor using a video camera to correlate with the synchronized representation of the image data.

15. The method of claim 14, further comprising integrating the visible light imagery with the image data using an aided target recognition module.

16. The method of claim 12, wherein the plurality of integrated passive sensors includes at least one of terahertz sensor, a millimeter wave sensor, and an infrared sensor to define the image contrast values.

17. The method of claim 15, further comprising detecting changes in radiated terahertz energy, millimeter energy, and infrared energy corresponding to the concealed object on a target using the aided target recognition module.

18. The method of claim 12, further comprising performing a computational analysis on the image data to detect the concealed object concealed under the target's clothing as a result of a sum of pixels, gray scale levels, or gradients exceeding or outlying an acceptable range of gray scale pixel values by a threshold value.

19. The method of claim 12, wherein the plurality of integrated passive sensors each having a different imaging distance range to increase a collective range that is greater than a respective imaging distance range of a given integrated passive sensor operating alone.

20. A non-transitory processor readable medium having processor instructions that are executable to cause a processor coupled to a memory to:
receive image data in a format of a plurality of pixels from a plurality of integrated passive sensors operating within at least two spectral bands;
store the image data in a plurality of image data buffers, each image data buffer storing the image data of a different spectral band;
transmit a synchronized representation of the image data from the plurality of integrated passive sensors to a display;
detect relative differences between image contrast values of the plurality of pixels within each image data buffer;
assign a particular status as a result of detecting the image contrast values within a portion of the image data exceeding a threshold indicating a probability of a concealed object; and
select an alarm signal based on the particular status defined by the probability of the concealed object.

21. The method of claim 20, wherein the plurality of integrated passive sensors each having a different imaging distance range to increase a collective range that is greater than a respective imaging distance range of a given integrated passive sensor operating alone.

* * * * *